United States Patent
Weinerth et al.

(10) Patent No.: US 9,244,574 B2
(45) Date of Patent: Jan. 26, 2016

(54) REDUCING ION-MIGRATION AND CORROSION IN ELECTRODES

(71) Applicant: Synaptics Incorporated, Santa Clara, CA (US)

(72) Inventors: John Michael Weinerth, San Jose, CA (US); Victor K. Kolesnichenko, San Jose, CA (US); Muthanna Salman, Cupertino, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 607 days.

(21) Appl. No.: 13/630,928

(22) Filed: Sep. 28, 2012

(65) Prior Publication Data

US 2014/0092051 A1   Apr. 3, 2014

(51) Int. Cl.
*G06F 3/044* (2006.01)
*G06F 3/041* (2006.01)

(52) U.S. Cl.
CPC .............. *G06F 3/044* (2013.01); *G06F 3/0418* (2013.01); *G06F 2203/04107* (2013.01)

(58) Field of Classification Search
CPC ........................ G06F 3/044; G06F 2203/04107
USPC ......................................................... 345/174
See application file for complete search history.

(56) References Cited

U.S. PATENT DOCUMENTS

| | | | |
|---|---|---|---|
| 8,243,043 B2 | 8/2012 | Bytheway | |
| 2004/0238894 A1* | 12/2004 | Furuta | 257/355 |
| 2011/0001549 A1* | 1/2011 | Van Gastel | 327/517 |
| 2011/0050600 A1* | 3/2011 | Kim et al. | 345/173 |
| 2011/0205172 A1* | 8/2011 | Kitada | 345/173 |
| 2011/0221700 A1 | 9/2011 | Mo et al. | |
| 2011/0279169 A1 | 11/2011 | Salaverry | |
| 2012/0068965 A1 | 3/2012 | Wada et al. | |
| 2012/0075249 A1 | 3/2012 | Hoch | |
| 2012/0162141 A1 | 6/2012 | Maki et al. | |
| 2013/0093706 A1* | 4/2013 | Kurasawa | G06F 3/0412 345/173 |

OTHER PUBLICATIONS

Leung, et al., "Corrosion Reliability Study of indium tin oxide (ITO) for Chip-on-Glass (COG)", Department of Electornic Engineeering, City University of Hong Kong, ©2008 IEEE.
Z. P. Wang, Challenges in the Reliability Study of Chip-On-Glass (cog) Technology for Mobile Display Applications, Philips Mobile Display Systems, ©2003 IEEE.

* cited by examiner

*Primary Examiner* — Koosha Sharifi-Tafreshi
*Assistant Examiner* — Chun-Nan Lin
(74) *Attorney, Agent, or Firm* — Patterson + Sheridan, LLP

(57) ABSTRACT

Embodiments of the present invention generally provide a processing system for an input device including a sensor module having sensor circuitry. The sensor module may be coupled to transmitter electrodes, receiver electrodes, and a shield electrode. The sensor module may be configured for transmitting transmitter signals with the transmitter electrodes, receiving resulting signals with the receiver electrodes, and transitioning the shield electrode from a first voltage to a second voltage during a non-sensing time period. The resulting signals may include effects which correspond to the transmitter signals. The input device may further include a determination module configured for determining positional information for an input object based at least in part on the resulting signals.

20 Claims, 6 Drawing Sheets

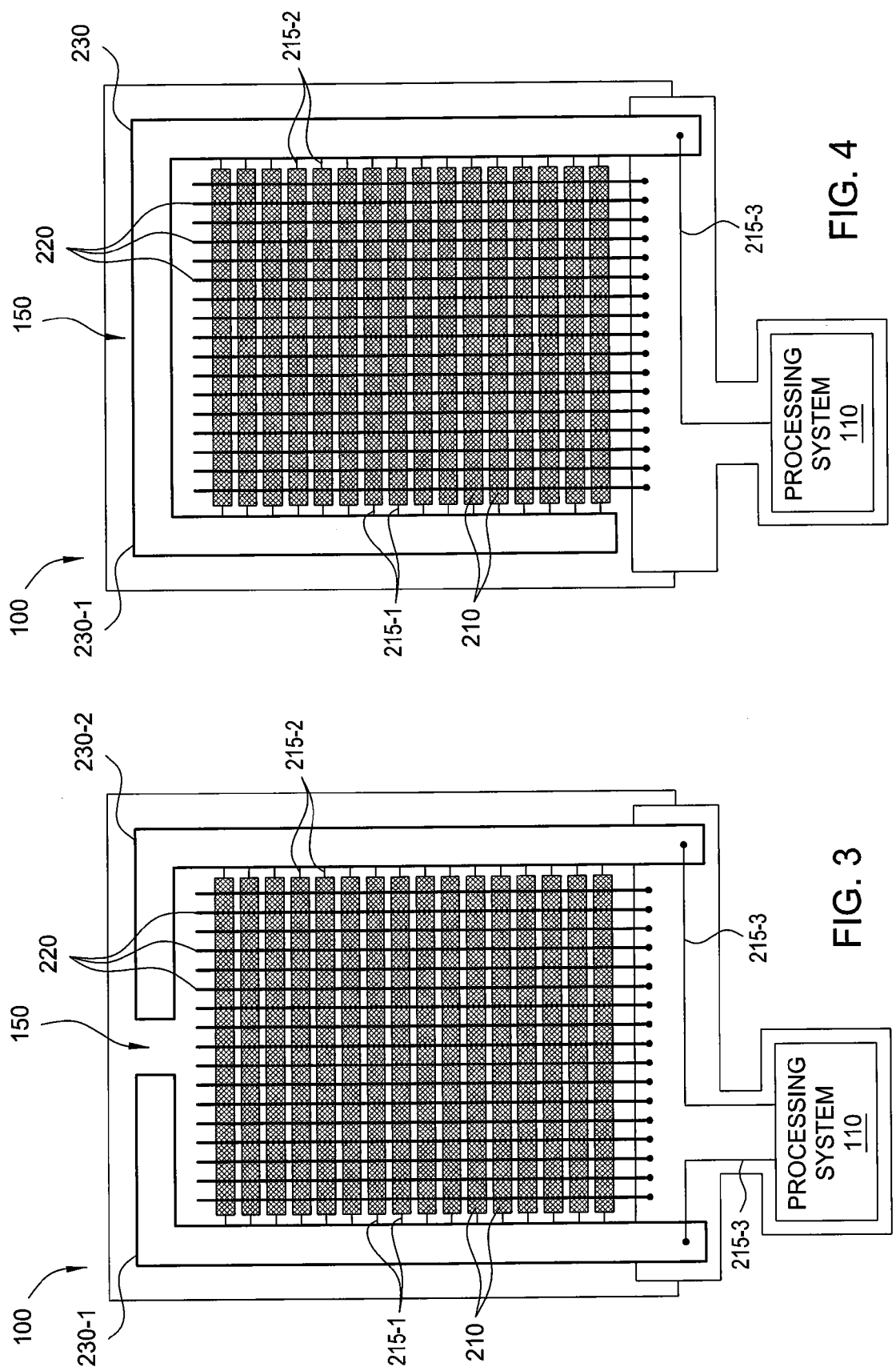

REDUCING ION-MIGRATION AND CORROSION IN ELECTRODES

CROSS-REFERENCE TO RELATED APPLICATIONS

This application claims benefit of U.S. Provisional Patent Application Ser. No. 61/545,742, filed Oct. 11, 2011, which is herein incorporated by reference in its entirety.

DESCRIPTION OF THE RELATED ART

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems (such as touchpads integrated in, or peripheral to, notebook or desktop computers). Proximity sensor devices are also often used in smaller computing systems (such as touch screens integrated in cellular phones or tablet computers).

Proximity sensor devices may include one or more types of electrodes configured for display updating and/or for transmitting input sensing signals. In configurations in which the sensing region of the proximity sensor device is integrated with or overlaps the display region of the computing device, transparent electrodes may be used to prevent the sensing region from significantly obscuring the user's view of the display region. Such electrodes are commonly composed of a transparent conductive oxide material, such as indium tin oxide (ITO).

The strength of the electromagnetic field between electrodes is inversely proportional to the square of the distance between the electrodes. As devices move towards incorporating greater numbers of electrodes, the space between adjacent electrodes may be reduced, increasing the strength of the electromagnetic field between the electrodes. Increasing this electromagnetic field is particularly harmful in devices which use transparent electrodes, since a strong electromagnetic field will increase the rate at which ions migrate between the electrodes, resulting in corrosion, reduced optical clarity, and reduced longevity. Additionally, when combined with a strong electromagnetic field, other factors, such as moisture, humidity, and impurities, may increase the rate at which ion-migration occurs.

Therefore, there is a need for an improved method and device for reducing ion-migration between electrodes in proximity sensor devices.

SUMMARY OF THE INVENTION

Embodiments of the present invention generally provide a processing system for an input device including a sensor module having sensor circuitry. The sensor module may be coupled to transmitter electrodes, receiver electrodes, and a shield electrode. The sensor module may be configured for transmitting transmitter signals with the transmitter electrodes, receiving resulting signals with the receiver electrodes, and transitioning the shield electrode from a first voltage to a second voltage during a non-sensing time period. The resulting signals may include effects which correspond to the transmitter signals. The input device may further include a determination module configured for determining positional information for an input object based at least in part on the resulting signals.

Embodiments of the present invention may also provide an input device including transmitter electrodes, receiver electrodes, a shield electrode, a sensor module, and a determination module. The sensor module includes sensor circuitry and is coupled to the transmitter electrodes, the receiver electrodes, and the shield electrode. The sensor module is configured to transmit transmitter signals with the transmitter electrodes, receive resulting signals with the receiver electrodes, and transition the shield electrode from a first voltage to a second voltage during a non-sensing time period. The resulting signals include effects corresponding to the transmitter signals. The determination module is configured to determine positional information for an input object based at least in part on the resulting signals.

Embodiments of the present invention may also provide a method of capacitive sensing with an input device having a sensor module and a determination module. The sensor module includes sensor circuitry and is coupled to transmitter electrodes, receiver electrodes, and a shield electrode. The method includes transmitting transmitter signals with the transmitter electrodes during a sensing time period, receiving resulting signals with the receiver electrodes, driving the shield electrode with a first voltage during the sensing time period and a second voltage during a non-sensing time period, and determining positional information for an input object based at least in part on the resulting signals. The resulting signals include effects which correspond to the transmitter signals.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

FIG. 3 is a partial schematic plan view of the input device having a two-shield configuration.

FIG. 4 is a partial schematic plan view of the input device having a single-shield configuration.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present invention generally provide a system and method for reducing ion-migration between sensor electrodes. The method may include transitioning the voltage(s) of a shield electrode and/or receiver electrode to reduce, eliminate, or compensate for the electromagnetic field between the electrodes. By transitioning and/or modulating the voltage of one electrode with respect to the other electrode during sensing and/or non-sensing time periods, the effects of ion-migration between the electrodes may be mitigated or substantially eliminated, thereby reducing electrode corrosion and increasing the performance (e.g., conductivity, optical performance, etc.) and longevity of the electrodes.

Figure 1:
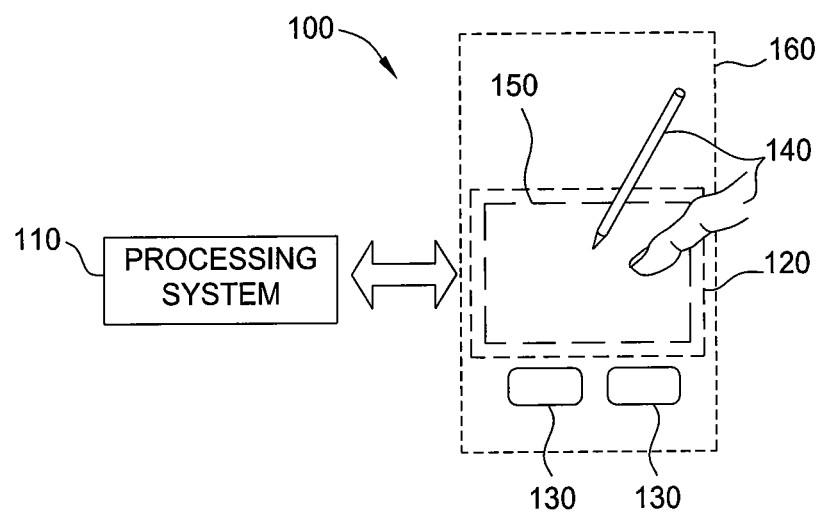
FIG. 1 is a display device having an integrated input device.

Turning now to the figures, FIG. 1 is a block diagram of an exemplary input device 100 in accordance with embodiments of the invention. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice) and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system or can be physically separate from the electronic system. As appropriate, the input device 100 may communicate with parts of the electronic system using any one or more of the following: buses, networks, and other wired or wireless interconnections (including serial and or parallel connections). Examples include I²C, SPI, PS/2, Universal Serial Bus (USB), Bluetooth, RF, and IRDA.

In the embodiment depicted in FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 overlays the display screen of the display device 160 and encompasses any space above, around, in, and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g., a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. The facesheet (e.g., LCD Lens 510) may provide a useful contact surface for an input object.

The input device 100 may utilize any combination of sensor components and sensing technologies to detect user input in the sensing region 120. The input device 100 comprises one or more sensing elements for detecting user input. Some implementations are configured to provide images that span one, two, three, or higher dimensional spaces. Some implementations are configured to provide projections of input along particular axes or planes. Cursors, menus, lists, and items may be displayed as part of a graphical user interface and may be scaled, positioned, selected scrolled, or moved.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitive sensing elements 150, such as sensor electrodes, to create electric fields. In some capacitive implementations, separate sensing elements 150 may be ohmically shorted together to form larger sensor electrodes. Some capacitive implementations utilize resistive sheets (e.g., may comprise a resistive material such as ITO or the like), which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, changing the measured capacitive coupling. In one implementation, an absolute capacitance sensing method operates by modulating sensor electrodes with respect to a reference voltage (e.g., system ground) and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals and/or to one or more sources of environmental interference (e.g., other electromagnetic signals). Sensor electrodes may be dedicated transmitters or receivers, or sensor electrodes may be configured to both transmit and receive. Alternatively, the receiver electrodes may be modulated relative to ground.

In FIG. 1, a processing system 110 is shown as part of the input device 100. The processing system 110 is configured to operate the hardware of the input device 100 to detect input in the sensing region 120. The sensing region 120 includes an array of sensing elements 150. The processing system 110 comprises parts of, or all of, one or more integrated circuits (ICs) and/or other circuitry components. For example, a processing system for a mutual capacitance sensor device may comprise transmitter circuitry configured to transmit signals with transmitter sensor electrodes and/or receiver circuitry configured to receive signals with receiver sensor electrodes. In some embodiments, the processing system 110 also comprises electronically-readable instructions, such as firmware code, software code, and/or the like. In some embodiments, components of the processing system 110 are located together, such as near sensing element(s) of the input device 100. In other embodiments, components of processing system 110 are physically separate with one or more components close to sensing element(s) of input device 100 and one or more components elsewhere. For example, the input device 100 may be a peripheral coupled to a desktop computer, and the processing system 110 may include software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120 or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 of the sensing device overlaps at least part of an active area of a display screen of the display device 160. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
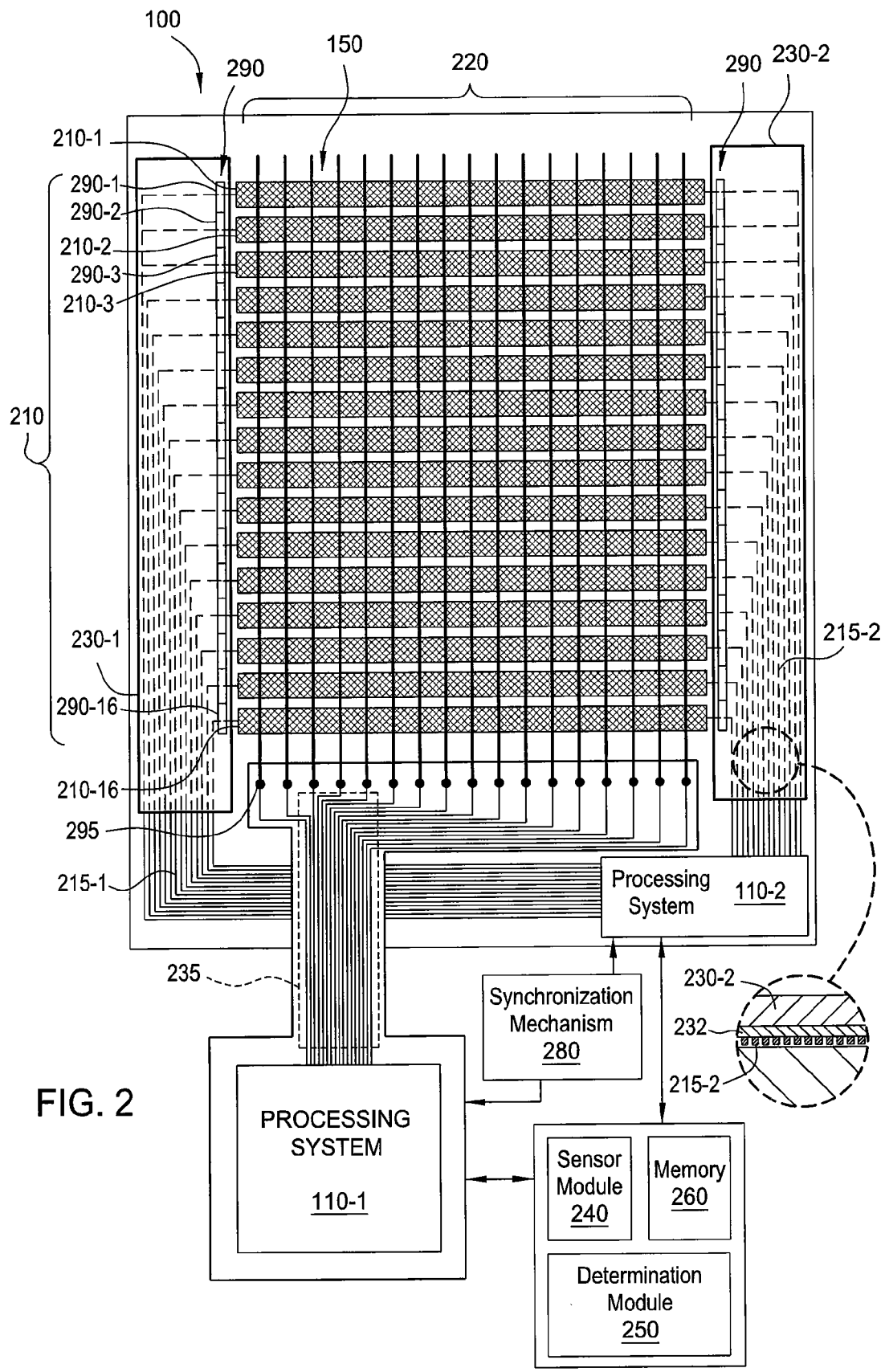
FIG. 2 is a partial schematic plan view of the input device of FIG. 1 in accordance with embodiments of the invention.

FIG. 2 is a partial schematic plan view of the input device 100 of FIG. 1 in accordance with embodiments of the invention. The input device 100 includes an array of sensing elements 150, a processing system 110, shield electrodes 230, and a synchronization mechanism 280. The array of sensing elements 150 includes a plurality of common electrodes 210 (e.g., 210-1, 210-2, 210-3, etc.) and a plurality of receiver electrodes 220 (e.g., 220-1, 220-2, 220-3, etc.). The processing system 110 may include two separate processing system integrated circuits (ICs) (e.g., processing system IC 110-1 and processing system IC 110-2). Processing system IC 110-1, 110-2 may include a sensor module 240, a determination module 250, and/or a memory 260 and a synchronization mechanism 380. The processing system IC 110-2 is coupled to the common electrodes 210 through a plurality of conductive routing traces 215-1, 215-2 (collectively "215"). The conductive routing traces 215 may be shielded from the receiver electrodes 220 by shield electrodes 230-1, 230-2 (collectively "230").

The processing system IC 110-1 is coupled to the plurality of receiver electrodes 220 and configured to receive resulting signals from the receiver electrodes 220 indicative of input (or lack of input) in the sensing region 120 and/or of environmental interference. Processing system IC 110-1 may also be configured to pass the resulting signals to the determination module 250 for determining the presence of an input object and/or to the memory 260 for storage. In various embodiments, the processing system IC 110-2 may be coupled to optional drivers 290 for the common electrodes. The optional drivers 290 may be fabricated using the thin-film-transistors (TFT) and may comprise switches, combinatorial logic, multiplexers, and other selection and control logic.

One or both of the display circuitry (not shown) of the processing system IC 110-2 and the sensor module 240, which includes sensor circuitry, may be configured for updating images on the display screen of the display device 160. For example, the display and/or sensor circuitry may be configured to apply one or more pixel voltages to the display pixel electrodes through pixel source drivers (not shown). The display and/or sensor circuitry may also be configured to apply one or more common drive voltages to the common electrodes 210 to update the display screen. In addition, the processing system IC 110-2 is configured to operate the common electrodes 210 as transmitter electrodes for input sensing by driving transmitter signals onto the common electrodes 210.

While the processing system illustrated in FIG. 2 includes two ICs, the processing system may be implemented with more or less ICs to control the various components in the input device. For example, the functions of the processing system IC 110-1 and the processing system IC 110-2 may be implemented in one integrated circuit that can control the display module elements (e.g., common electrodes 210) and drive transmitter signals and/or receive resulting signals received from the array of sensing elements 150. In embodiments where there are more than one processing system IC, communications between separate processing system ICs 110-1, 110-2 may be achieved through the synchronization mechanism 280, which sequences the signals provided to the common electrodes 210. Alternatively the synchronization mechanism may be internal to any one of the IC's.

Common electrodes 210 and receiver electrodes 220 are ohmically isolated from each other by one or more insulators which separate the common electrodes 210 from the receiver electrodes 220 and prevent them from electrically shorting to each other. The electrically insulative material separates the common electrodes 210 and the receiver electrodes 220 at cross-over areas at which the electrodes intersect. In one such configuration, the common electrodes 210 and/or receiver electrodes 220 are formed with jumpers connecting different portions of the same electrode. In other configurations, the common electrodes 210 and the receiver electrodes 220 are separated by one or more layers of electrically insulative material or by one or more substrates, as described in further detail below.

The areas of localized capacitive coupling between common electrodes 210 and receiver electrodes 220 may be termed "capacitive pixels." The capacitive coupling between the common electrodes 210 and receiver electrodes 220 changes with the proximity and motion of input objects in the sensing region 120 associated with the common electrodes 210 and the receiver electrodes 220.

In some embodiments, the sensor pattern is "scanned" to determine these capacitive couplings. That is, the transmitter electrodes are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined. The transmitter electrodes may transmit transmitter signal bursts. Transmitter signal bursts may include multiple transmitter signal cycles (e.g., 20-40 capacitance samples). Typically, two or more transmitter signal bursts may be transmitted for each row for each capacitive frame.

The receiver sensor electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

In some touch screen embodiments, transmitter electrodes comprise one or more common electrodes (e.g., "V-corn electrode") used in updating the display of the display screen. These common electrodes may be disposed on an appropriate display screen substrate. For example, the common electrodes may be disposed on the TFT glass in some display screens (e.g., In Plan Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode," since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes).

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats.

As shown in FIG. 2, conductive routing traces 215-1 are coupled to one end of each common electrode 210, and conductive routing traces 215-2 are coupled to the other end of each common electrode 210 such that each common electrode 210 is driven for input sensing and/or display updating from both ends. It is also contemplated that conductive routing traces 215 may be coupled to only a single end of each of the common electrodes 210 or have another configuration.

The conductive routing traces 215 may be shielded from the receiver electrodes 220 by shield electrodes 230 in a manner that reduces the capacitive coupling between the conductive routing traces 215 and the receiver electrodes 220. The shield electrodes 230 may be vertically aligned over the conductive routing traces 215 and are positioned between the conductive routing traces 215 and the receiver electrodes 220. The shield electrodes 230 may also be positioned between the conductive routing traces 215 and an input object to reduce capacitive coupling between the conductive routing traces 215 and the input object, which may affect the capacitive signals received by the receiver electrodes 220. To prevent the shield electrodes 230 from electrically shorting to the conductive routing traces 215, the shield electrodes 230 are electrically isolated from the conductive routing traces 215, for example, by an insulating layer 232.

The shield electrodes 230 may suppress the degree to which other sources of interference (e.g., signal transmitters, wireless radios, external interference coupled through an input object, etc.) affect the quality of the signal received by the receiver electrodes 220. For example, when positioned between the conductive routing traces 215 and the receiver electrodes 220 and/or between the conductive routing traces 215 and an input object (e.g., a finger, a stylus, etc.), the shield electrodes 230 reduce the effect of the input object on the capacitive coupling between the conductive routing traces 215 and the receiver electrodes 220. As a result, because various capacitance sensing methods are based on detecting changes in capacitive coupling (e.g., mutual capacitance methods), "noise" produced due to the capacitive coupling of the conductive routing traces 215 with the input object and/or receiver electrodes 220 is reduced, increasing the accuracy with which the presence or absence of the input object can be detected. Reducing noise from the conductive routing traces 215 is particularly important near the edges of the sensing region 120, where there are less capacitive "pixels" and, consequently, less input sensing information. Thus, the shield electrodes 230 increase response uniformity between the center and edges of the sensing region 120, increasing the accuracy with which the sensing region 120 is able to detect the presence or absence of an input object.

The shield electrodes 230 are made of a conducting material, such as a metal or a transparent conductive oxide (e.g., indium tin oxide), and may be formed as solid strip, a mesh, or any other configuration which is capable of blocking electromagnetic fields. In addition, although the shield electrodes 230 are shown as rectangular in shape, they may be formed in any shape which effectively shields the receiver electrodes 220 from the conductive routing traces 215. In some embodiments, the shield electrodes 230 may be disposed around the edges of the device and/or may also serve as an electrostatic discharge (ESD) strike ring. In other embodiments, shield electrode(s) 230 may be positioned to shield the receiver electrodes 220 from other sources of interference, positioned to reduce the degree to which the sensor elements 150 interfere with various components within the input device 100, and/or positioned in one or more other layers of the input device 100.

As discussed in further detail in conjunction with FIGS. 5 and 6A-6E, the shield electrode(s) 230 may be driven with a shield signal to compensate for or substantially reduce an electromagnetic field which exists between the shield electrode and one or more receiver electrodes during operation of the input device 100. The shield electrode(s) 230 may be coupled with one or more processing system ICs 110, and one or more processing system ICs 110 may be configured to drive the shield electrode(s) 230. For example, one or more shield electrodes 230 may be coupled to one or more processing system ICs 110 through a common flexible connector, flexible printed circuit (FPC), such as a "flex tail," or other connecting device. Optionally, the flex tail may include a shield and may be coupled to the receiver electrodes 220 by a plurality of through-connections or vias 295 disposed through a sealing glass layer of the input device 100. Additionally, circuitry external from the processing system may be used to drive the shield electrode, either in combination with the processing system or in conjunction with the processing system.

The shield electrodes 230 may be positioned between the receiver electrodes 220 and the conductive routing traces 215, or the shield electrodes 230 may be positioned such that they do not directly obstruct the line-of-sight between these elements. Moreover, the shield electrodes 230 may be disposed on the same layer as the receiver electrodes 220, or the shield electrodes 230 may be disposed on a layer that is between the lens and the layer on which the receiver electrodes 220 are disposed. In one embodiment, an optional flexible printed circuit may be coupled to the input device, where the optional flexible printed circuit comprises a shield electrode that is different from shield electrode 230. In yet another embodiment, shield electrode 230 may be integrated within a display device.

FIG. 3 is a partial schematic plan view of the input device 100 having a two-shield configuration. FIG. 4 is a partial schematic plan view of the input device 100 having a single-shield configuration. In the two-shield configuration, conductive routing traces 215-1 are shielded by shield electrode 230-1, and conductive routing traces 215-2 are shielded by shield electrode 230-2. In this configuration, the shield electrodes 230-1, 230-2 may be coupled together with one or more conductive routing traces 215-3, for example, in order to provide a shield signal to the shield electrodes 230. In the single-shield configuration, both sets of conductive routing traces 215-1, 215-2 are shielded by shield electrode 230. Other shield configurations, such as configurations including three or more shield electrodes, may also be used with the input and display devices 100, 160 described herein.

In order to prevent the shield electrode(s) 230 from acting as an antenna—and potentially interfering with wireless communication signals sent to and from the device in which input device 100 is disposed—the shield electrode(s) 230 may be configured such that they do not form a closed loop. Thus, in the two-shield configuration shown in FIG. 3, shield electrode 230-1 is electrically isolated from shield electrode 230-2. In the single-shield configuration shown in FIG. 4, the shield electrode 230 may be connected to the flex cable at a single end and, thus, does not form a closed loop.

Reducing Ion-Migration and Corrosion in Electrodes

Figure 5:
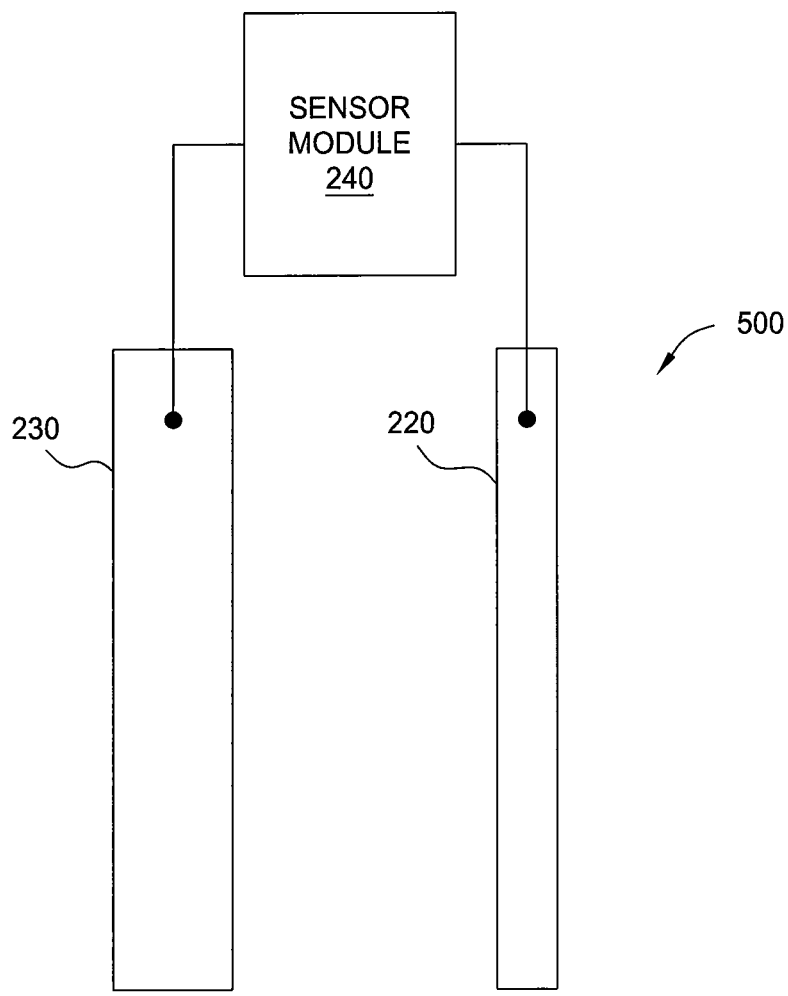
FIG. 5 is schematic plan view of a shield electrode disposed proximate to a receiver electrode in the input device of FIG. 2.

FIG. 5 is schematic plan view of a shield electrode 230 disposed proximate to a receiver electrode in the input device 100 of FIG. 2. The shield electrode 230 and/or the receiver electrode 220 may comprise a substantially transparent, conductive material such as indium tin oxide (ITO) or the like.

FIGS. 6A-6E illustrate voltages of the shield electrode 230 and the receiver electrode 220 of FIG. 5 as a function of time during operation of the input device 100. As shown in FIGS. 6A-6E, the shield electrode 230 may be driven with a voltage ($V_S$), and the receiver electrode 220 may be driven with a voltage ($V_R$).

Figure 6A:
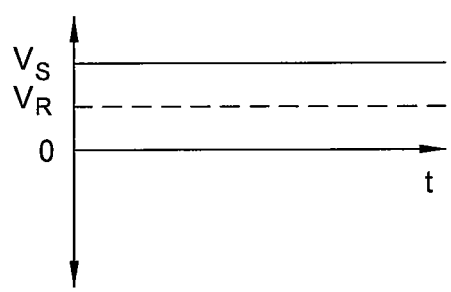
FIGS. 6A-6E illustrate the voltages of the shield electrode and the receiver electrode of FIG. 5 as a function of time during operation of the input device.

FIG. 6A is illustrative of conventional operation of a shield electrode 230 during which the shield electrode 230 is driven with a substantially constant voltage in order to suppress the degree to which sources of interference (e.g., signal transmitters, wireless radios, external interference coupled through an input object, etc.) affect the quality of the signal received by the receiver electrodes 220 during input sensing. In FIG. 6A, the shield electrode 230 is driven at a higher voltage than the receiver electrode 220, creating an electromagnetic field between the shield electrode 230 and the receiver electrode 220 that causes ion-migration between the electrodes. As a result, one or both of the electrodes may experience corrosion.

FIGS. 6B-6E illustrate voltages of the shield electrode 230 and the receiver electrode 220 as a function of time when the electrodes are driven in a manner intended to decrease the rate at which ion-migration occurs between the electrodes as compared to the convention example described with reference to FIG. 6A. Each of the first time periods ($t_1$) shown in FIGS. 6B-6E may correspond to a sensing time period in which the receiver electrode 220 is being operated for input sensing in conjunction with other components of the input device 100. For example, during a sensing time period, one or more common electrodes 210 may be driven with transmitter signals, and the receiver electrode 220 may be utilized for receiving resulting signals, where the resulting signals include effects of the transmitter signals indicative of the presence (or lack thereof) of an input object in the sensing region 120. Each of the second time periods ($t_2$) may correspond to a non-sensing time period in which the receiver electrode 220 and input device 100 are not being operated for input sensing.

Figure 6B:
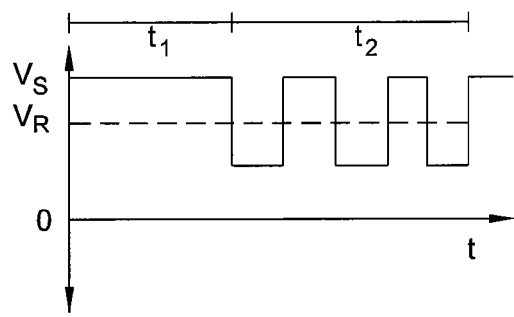

In the embodiment illustrated in FIG. 6B, both the shield and receiver electrodes 230, 220 are driven with a substantially constant voltage (e.g., a supply voltage, a system ground voltage, or the like) during a first time period ($t_1$). The voltage provided to the shield electrodes 230 and receiver electrode 220 may be the same or different. During the first time period ($t_1$), the voltage $V_S$ of the shield electrode 230 corresponds to a first voltage. During a second time period ($t_2$), the voltage $V_S$ of the shield electrode 230 is transitioned from the first voltage to a second voltage. More specifically, during the first time period ($t_1$), the shield electrode 230 is driven with a higher voltage than the receiver electrode 220, and during the second time period ($t_2$), the voltage $V_S$ of the shield electrode 230 is modulated such that the voltage $V_S$ is higher than the voltage $V_R$ of the receiver electrode 220 and then lower than the voltage $V_R$ of the receiver electrode 220. Alternatively, during the second time period ($t_2$), the voltage $V_S$ of the shield electrode 230 may be held constant, and the voltage $V_R$ of the receiver electrode 220 may be modulated such that the voltage $V_R$ is higher than the voltage $V_S$ of the shield electrode 230 and then lower than the voltage $V_S$ of the shield electrode 230. Advantageously, by modulating the voltage(s) of one or both electrode(s) relative to the other during the second time period ($t_2$), ion migration between the electrodes may be reduced or substantially eliminated as compared to the example of FIG. 6A.

Figure 6C:
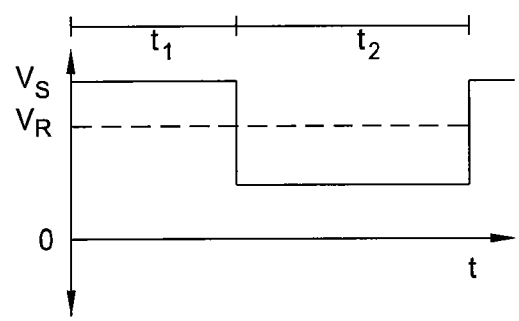
Figure 6D:
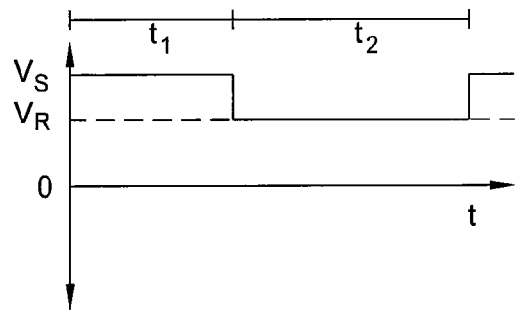

In the embodiments illustrated in FIGS. 6C and 6D, both the shield and receiver 230, 220 electrodes are again driven with a substantially constant voltage during a first time period ($t_1$). In FIG. 6C, during the second time period ($t_2$), the shield electrode 230 is driven at a voltage $V_S$ that is below the voltage $V_R$ of the receiver electrode 220. Consequently, over the course of the first and second time periods ($t_1$ and $t_2$), the electrodes may experience a net ion-migration that is reduced or substantially equal to zero as compared to the example of FIG. 6A. In the embodiment illustrated in FIG. 6D, during the second time period ($t_2$), the shield electrode 230 is driven at a voltage $V_S$ that is substantially equal to the voltage $V_R$ of the receiver electrode 220. Thus, in FIG. 6D, the electromagnetic field between the electrodes is substantially eliminated during the second time period ($t_2$), reducing or eliminating ion-migration between the electrodes as compared to the example of FIG. 6A.

Figure 6E:
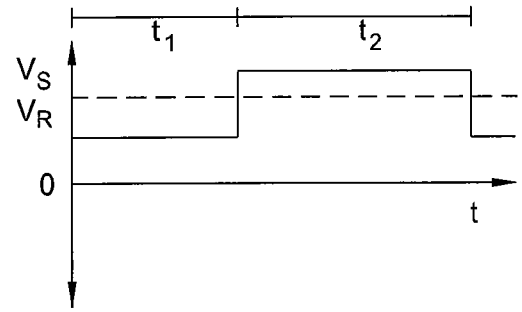

FIG. 6E illustrates an embodiment in which the shield electrode 230 and receiver electrode 220 are driven at substantially constant voltages during the first time period ($t_1$), and the voltage $V_R$ of the receiver electrode 220 is modulated during a second time period ($t_2$). In a manner similar to the technique described in conjunction with FIG. 6C, this technique may produce a net ion-migration that is reduced or substantially equal to zero over the course of the first and second time periods ($t_1$ and $t_2$) as compared to the example of FIG. 6A.

In yet another embodiment, the shield electrode 230 and the receiver electrode 220 may be driven at the same voltage $V_S/V_R$ during first and second time periods ($t_1$ and $t_2$). Thus, in this embodiment, the electromagnetic field between the electrodes is substantially eliminated during both the first and second time periods ($t_1$ and $t_2$), reducing or eliminating ion-migration between the electrodes as compared to the example of FIG. 6A.

Although FIGS. 6B-6E each illustrate the shield electrode 230 and receiver electrode 220 being driven with voltages which are positive with respect to a reference voltage during the first and second time periods ($t_1$ and $t_2$), these techniques are equally applicable for driving the shield electrode 230 and/or receiver electrode 220 with voltages which are negative with respect to the reference voltage. For example, the shield electrode 230 and receiver electrode 220 may be driven with substantially constant voltages which are negative with respect to the reference voltage during the first and second time periods ($t_1$ and $t_2$), where the magnitude of the shield electrode 230 voltage $V_S$ is greater than the magnitude of the receiver electrode 220 voltage $V_R$ during the first time period $t_1$, and the magnitude of the receiver electrode 220 voltage $V_R$ is greater than the magnitude of the shield electrode 230 voltage $V_S$ during the second time period $t_2$. As another example, the shield electrode 230 and receiver electrode 220 may be driven with voltages which are positive with respect to a reference voltage during the first time period ($t_1$), where the magnitude of the shield electrode 230 voltage $V_S$ is greater than the magnitude of the receiver electrode 220 voltage $V_R$ during the first time period $t_1$, and the shield electrode 230 may be driven with a voltage which is negative with respect to the reference voltage during the second time period ($t_2$) while the receiver electrode 220 is driven with a voltage which is positive with respect to the reference voltage.

The first and second time periods ($t_1$ and $t_2$) may correspond to one or more non-display time periods in which the display device 160 is not being driven for display updating. Moreover, the first time period ($t_1$) may overlap with a non-sensing time period, and/or the second time period ($t_2$) may overlap with a sensing time period. The first and second time periods ($t_1$ and $t_2$) may be of equal durations, or they may be of different durations. Additionally, the first and second time periods ($t_1$ and $t_2$) may be part of a single capacitive frame, they may be part of different capacitive frames, or they may occur between capacitive frames, transmitter signal cycles, or transmitter signal bursts sent to the common electrodes 210.

Although the techniques illustrated in FIGS. 6A-6E have been described in conjunction with a single shield electrode 230 and a single receiver electrode 220, it is contemplated that these techniques may be implemented with a plurality of shield electrodes 230 and/or a plurality of receiver electrodes 220. For example, the techniques described herein may be implemented with a plurality of receiver electrodes 220 and one or more shield electrodes 230 included in the input device 100 of FIG. 2. Moreover, it is contemplated that other electrodes, including other types of shield electrodes or receiver electrodes, may be operated in the manner reflected in FIGS. 6A-6E.

Figure 7:
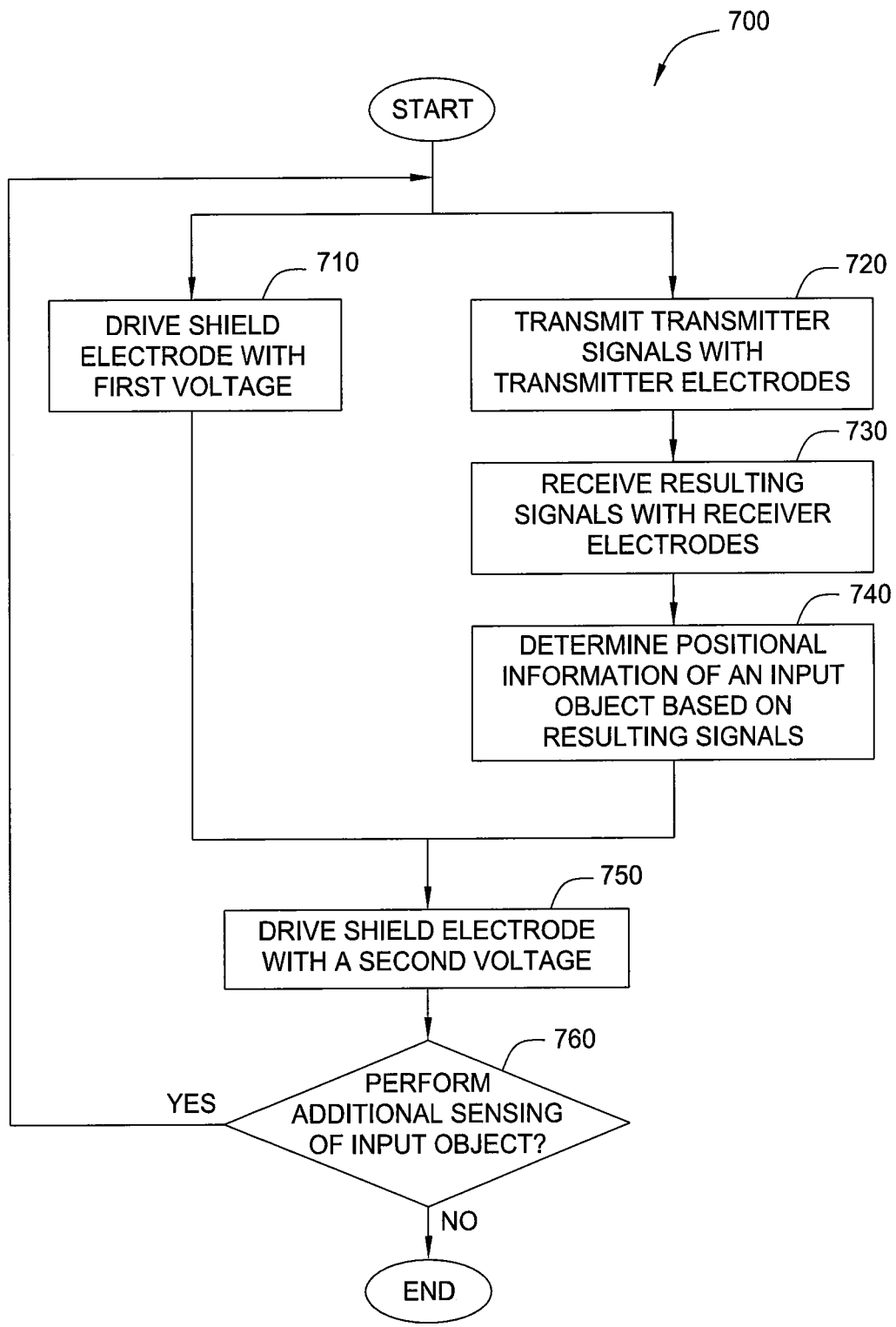
FIG. 7 is a flow diagram of method steps for performing capacitive sensing in an input device having a sensor module and a determination module according to one embodiment of the present invention.

FIG. 7 is a flow diagram of method steps for performing capacitive sensing in an input device having a sensor module 240 and a determination module 250 according to one embodiment of the present invention. Although the method steps are described in conjunction with FIGS. 1-4, persons skilled in the art with understand that any system configured to perform the method steps, in any order, falls within the scope of the present invention.

The method begins at step 710, where the sensor module 240 drives the shield electrode 230 with a first voltage during a sensing time period. The first voltage may be a substantially constant voltage. At step 720, the sensor module 240 transmits transmitter signals with the transmitter electrodes 220 during the sensing time period. At step 730, the sensor module 240 receives resulting signals with the receiver electrodes 210. The resulting signals comprise effects corresponding to the transmitter signals. At step 740, the determination module 250 determines positional information for an input object based at least in part on the resulting signals. Although FIG. 7 illustrates step 740 as taking place concurrently with step 710, in other embodiments, step 740 may take place at any time after the completion of step 730, including before, during, or after step 750. Further, although step 750 is illustrated as occurring after steps 720, 730, and 740, it is contemplated that the shield electrode 230 may transition from being driven with a first voltage (step 710) to being driven with a second voltage (step 750) during or after any of steps 720, 730, or 740.

At step 750, the sensor module 240 drives the shield electrode 230 with a second voltage during a non-sensing time period. The second voltage may be a substantially constant voltage. Additionally, driving the shield electrode 230 with the second voltage may include modulating the second voltage during the non-sensing time period. The shield electrode 230 may be driven with the second voltage between capacitive frames, between transmitter signal cycles, and/or between transmitter signal bursts. In one embodiment, the first and second voltages each may be substantially constant and different.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for an input device comprising:
a sensor module comprising sensor circuitry, the sensor module coupled to transmitter electrodes, receiver electrodes, and a shield electrode, the sensor module configured for:
transmitting transmitter signals with the transmitter electrodes;
receiving resulting signals with the receiver electrodes, the resulting signals comprising effects corresponding to the transmitter signals; and
transitioning the shield electrode from a first voltage to a second voltage during a non-sensing time period; and a determination module configured for determining positional information for an input object based at least in part on the resulting signals.

2. The processing system of claim 1, wherein the sensor module is further configured for modulating the second voltage during the non-sensing time period.

3. The processing system of claim 1, wherein the non-sensing time period occurs between at least one of capacitive frames, transmitter signal cycles, and transmitter signal bursts.

4. The processing system of claim 1, wherein the sensor module is further configured for driving the shield electrode with a varying voltage during the non-sensing time period and driving the shield electrode with a substantially constant voltage during a sensing time period.

5. The processing system of claim 1, wherein the sensor module is further configured for driving the shield electrode with a first substantially constant voltage during a sensing time period and driving the shield electrode with a second substantially constant voltage during the non-sensing time period, wherein the first and second substantially constant voltages are different.

6. The processing system of claim 1, wherein the shield electrode and at least one receiver electrode are driven in a substantially similar manner during the non-sensing time period.

7. The processing system of claim 1, wherein at least one receiver electrode is driven at a third voltage during a sensing time period, wherein the first voltage is different than the third voltage, and the second voltage is substantially equal to the third voltage.

8. The processing system of claim 1, wherein at least one receiver electrode is driven at a third voltage during a sensing time period, wherein the first voltage is different than the third voltage, and the second voltage is different than the third voltage.

9. An input device comprising:
   transmitter electrodes;
   receiver electrodes;
   a shield electrode;
   a sensor module comprising sensor circuitry, the sensor module coupled to the transmitter electrodes, the receiver electrodes, and the shield electrode, the sensor module configured to:
       transmit transmitter signals with the transmitter electrodes;
       receive resulting signals with the receiver electrodes, the resulting signals comprising effects corresponding to the transmitter signals; and
       transition the shield electrode from a first voltage to a second voltage during a non-sensing time period; and
   a determination module configured to determine positional information for an input object based at least in part on the resulting signals.

10. The input device of claim 9, wherein the sensor module is further configured to modulate the second voltage during the non-sensing time period.

11. The input device of claim 9, wherein the shield electrode comprises an electrostatic discharge ring.

12. The input device of claim 9, wherein the transmitter electrodes comprise one or more common electrodes.

13. The input device of claim 12, wherein the capacitive sensing device is integrated with a display device, wherein the sensor module is further configured to drive one or more of the common electrodes to update the display device.

14. The input device of claim 9, further comprising a display device stacked with the receiver electrodes.

15. A method of capacitive sensing with an input device having a sensor module and a determination module, the sensor module comprising sensor circuitry and coupled to transmitter electrodes, receiver electrodes, and a shield electrode, the method comprising:
   transmitting transmitter signals with the transmitter electrodes during a sensing time period;
   receiving resulting signals with the receiver electrodes, the resulting signals comprising effects corresponding to the transmitter signals;
   driving the shield electrode with a first voltage during the sensing time period and a second voltage during a non-sensing time period;
   transitioning the shield electrode from the first voltage to the second voltage during the non-sensing time period and
   determining positional information for an input object based at least in part on the resulting signals.

16. The method of claim 15, wherein driving the shield electrode with the second voltage comprises modulating the second voltage during the non-sensing time period.

17. The method of claim 16, wherein driving the shield electrode with the first voltage comprises driving the shield electrode with a substantially constant voltage during the sensing time period.

18. The method of claim 15, wherein driving the shield electrode with the second voltage occurs between at least one of capacitive frames, transmitter signal cycles, and transmitter signal bursts.

19. The method of claim 15, wherein the first and second voltages are substantially constant and different.

20. The method of claim 15, further comprising driving the transmitter electrodes with a voltage that updates a display.

\* \* \* \* \*